United States Patent
Lee et al.

(10) Patent No.: US 11,943,648 B2
(45) Date of Patent: Mar. 26, 2024

(54) METHOD AND DEVICE FOR TRANSMITTING INFORMATION RELATED TO SIDELINK CHANNEL IN NR V2X

(71) Applicant: LG Electronics Inc., Seoul (KR)

(72) Inventors: Seungmin Lee, Seoul (KR); Hanbyul Seo, Seoul (KR); Daesung Hwang, Seoul (KR)

(*) Notice: Subject to any disclaimer, the term of this patent is extended or adjusted under 35 U.S.C. 154(b) by 236 days.

(21) Appl. No.: 17/437,358

(22) PCT Filed: Apr. 2, 2020

(86) PCT No.: PCT/KR2020/004520
§ 371 (c)(1),
(2) Date: Sep. 8, 2021

(87) PCT Pub. No.: WO2020/204630
PCT Pub. Date: Oct. 8, 2020

(65) Prior Publication Data
US 2022/0182866 A1    Jun. 9, 2022

Related U.S. Application Data

(60) Provisional application No. 62/828,444, filed on Apr. 2, 2019.

(30) Foreign Application Priority Data

Apr. 8, 2019   (KR) .................. 10-2019-0040910

(51) Int. Cl.
*H04W 24/10*     (2009.01)
*H04B 17/318*    (2015.01)
(Continued)

(52) U.S. Cl.
CPC .......... *H04W 24/10* (2013.01); *H04B 17/318* (2015.01); *H04W 4/40* (2018.02); *H04W 92/18* (2013.01)

(58) Field of Classification Search
CPC ....... H04W 24/10; H04W 92/18; H04W 4/40; H04B 17/318
See application file for complete search history.

(56) References Cited

U.S. PATENT DOCUMENTS

2017/0208636 A1*  7/2017  Agiwal ................ H04W 76/14
2018/0049219 A1*  2/2018  Gupta ................. H04W 72/563
(Continued)

OTHER PUBLICATIONS

Extended European Search Report in European Application No. 20782744.5, dated Mar. 30, 2022, 13 pages.
(Continued)

*Primary Examiner* — Jamal Javaid
*Assistant Examiner* — Ryan C Kavleski

(57) ABSTRACT

A method for performing wireless communication by a first device and a device for supporting same are provided. The method may comprise the steps of: receiving, from a second device, sidelink control information (SCI) including a field indicating transmission of a sidelink (SL) channel state information reference signal (CSI-RS); on the basis of the field indicating the transmission of the SL CSI-RS, determining that a report on SL channel state information has been requested by the second device; on the basis of the SL CSI-RS, acquiring the SL channel state information related to the channel state between the first device and the second device; and transmitting the SL channel state information to the second device.

22 Claims, 22 Drawing Sheets

(51) Int. Cl.
*H04W 4/40* (2018.01)
*H04W 92/18* (2009.01)

(56) References Cited

U.S. PATENT DOCUMENTS

| | | | |
|---|---|---|---|
| 2019/0053251 | A1 | 2/2019 | Loehr et al. |
| 2019/0075001 | A1 | 3/2019 | Stern-Berkowitz et al. |
| 2020/0228247 | A1* | 7/2020 | Guo .................. H04W 52/383 |
| 2020/0344771 | A1* | 10/2020 | Kang ................ H04W 28/0263 |
| 2021/0029675 | A1* | 1/2021 | Ji ........................... H04L 1/1896 |
| 2021/0218511 | A1* | 7/2021 | Zhang .................. H04L 1/1664 |

OTHER PUBLICATIONS

Intel Corporation, "Physical Layer Procedures for NR V2X Sidelink Design," 3GPP TSG RAN WG1 RAN1#96, R1-1903450, revision of R1-1902482, Athens, Greece, Feb. 25-Mar. 1, 2019, 14 pages.

Asia Pacific Telecom, "Discussion on sidelink resource allocation," R1-1905072, Presented at 3GPP TSG-RAN WG1 Meeting #96-Bis, Xi'an, China, Apr. 8-Apr. 12, 2019, 5 pages.

Ericsson, "On PHY procedures to support unicast and groupcast on NR sidelink," R1-1901212, Presented at 3GPP TSG-RAN WG1 Meeting # ah-1901, Taipei, Taiwan, Jan. 21-25, 2019, 11 pages.

Huawei, HiSilicon, "Design and contents of PSCCH and Psfch," R1-1903071, Presented at 3GPP Tsg Ran WG1 Meeting #96, Athens, Greece, Feb. 25-Mar. 1, 2019, 10 pages.

Intel Corporation, "Physical Layer Procedures for NR V2X Sidelink Design," R1-1902482, Presented at 3GPP TSG RAN WG1 RAN1#96, Athens, Greece, Feb. 25 to Mar. 1, 2019, 14 pages.

Vivo, "Physical layer procedure for NR sidelink," R1-1900118, Presented at 3GPP TSG RAN WG1 Ad-Hoc Meeting 1901, Taipei, Jan. 21-25, 2019, 9 pages.

Huawei, HiSilicon, "Design and contents of PSCCH and PSFCH," 3GPP TSG RAN WG1 Meeting #96, R1-1903071, Athens, Greece, Feb. 25-Mar. 1, 2019, 10 pages.

* cited by examiner

FIG. 4
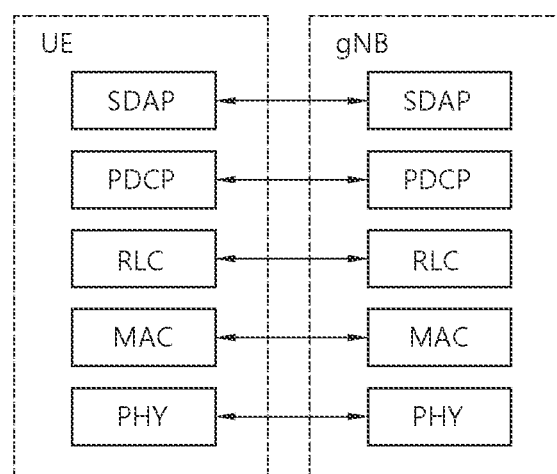
(a)
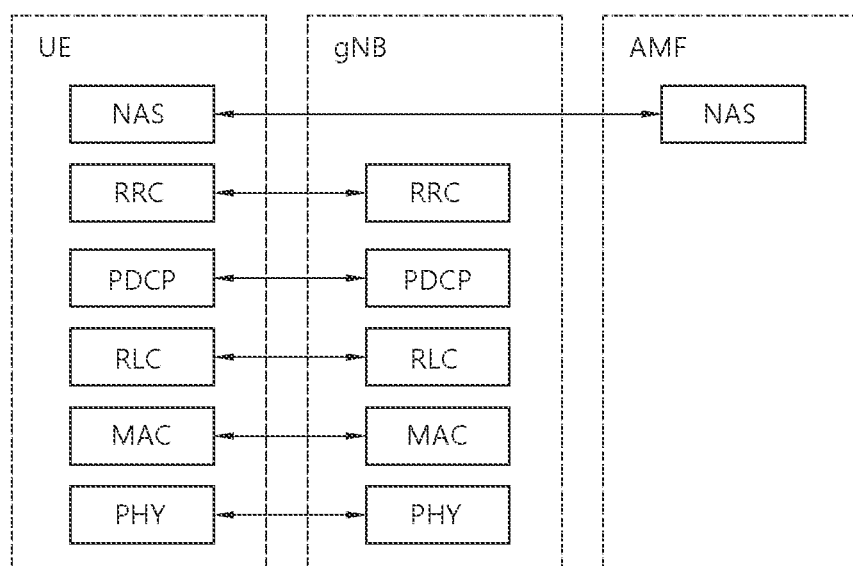
(b)

FIG. 8
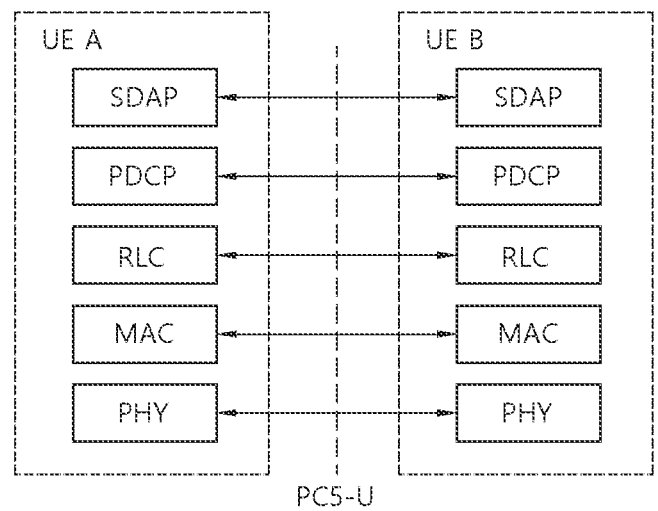
(a)
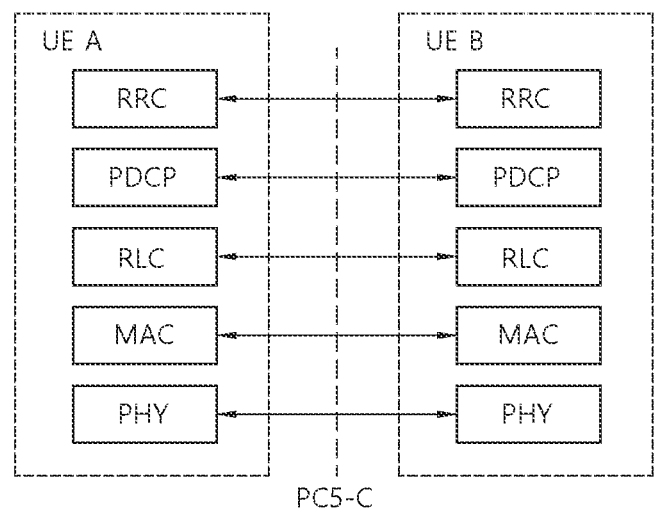
(b)

METHOD AND DEVICE FOR TRANSMITTING INFORMATION RELATED TO SIDELINK CHANNEL IN NR V2X

CROSS-REFERENCE TO RELATED APPLICATIONS

This application is a National Stage application under 35 U.S.C. § 371 of International Application No. PCT/KR2020/004520, filed on Apr. 2, 2020, which claims the benefit of U.S. Provisional Application No. 62/828,444, filed on Apr. 2, 2019, and Korean Patent Application No. 10-2019-0040910, filed on Apr. 8, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in SL communication, channel state information or measurement information needs to be reported between UEs.

Technical Solutions

In one embodiment, a method for performing wireless communication by a first device is provided. The method may comprise: receiving, from a second device, sidelink control information (SCI) including a field representing transmission of a sidelink (SL) channel state information reference signal (CSI-RS); determining that a report of SL channel state information is requested by the second device, based on the field representing transmission of the SL CSI-RS; obtaining the SL channel state information related to a channel state between the first device and the second device based on the SL CSI-RS; and transmitting, to the second device, the SL channel state information.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a second device, sidelink control information (SCI) including a field representing transmission of a sidelink (SL) channel state information reference signal (CSI-RS); determine that a report of SL channel state information is requested by the second device, based on the field representing transmission of the SL CSI-RS; obtain the SL channel state information related to a channel state between the first device and the second device based on the SL CSI-RS; and transmit, to the second device, the SL channel state information.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
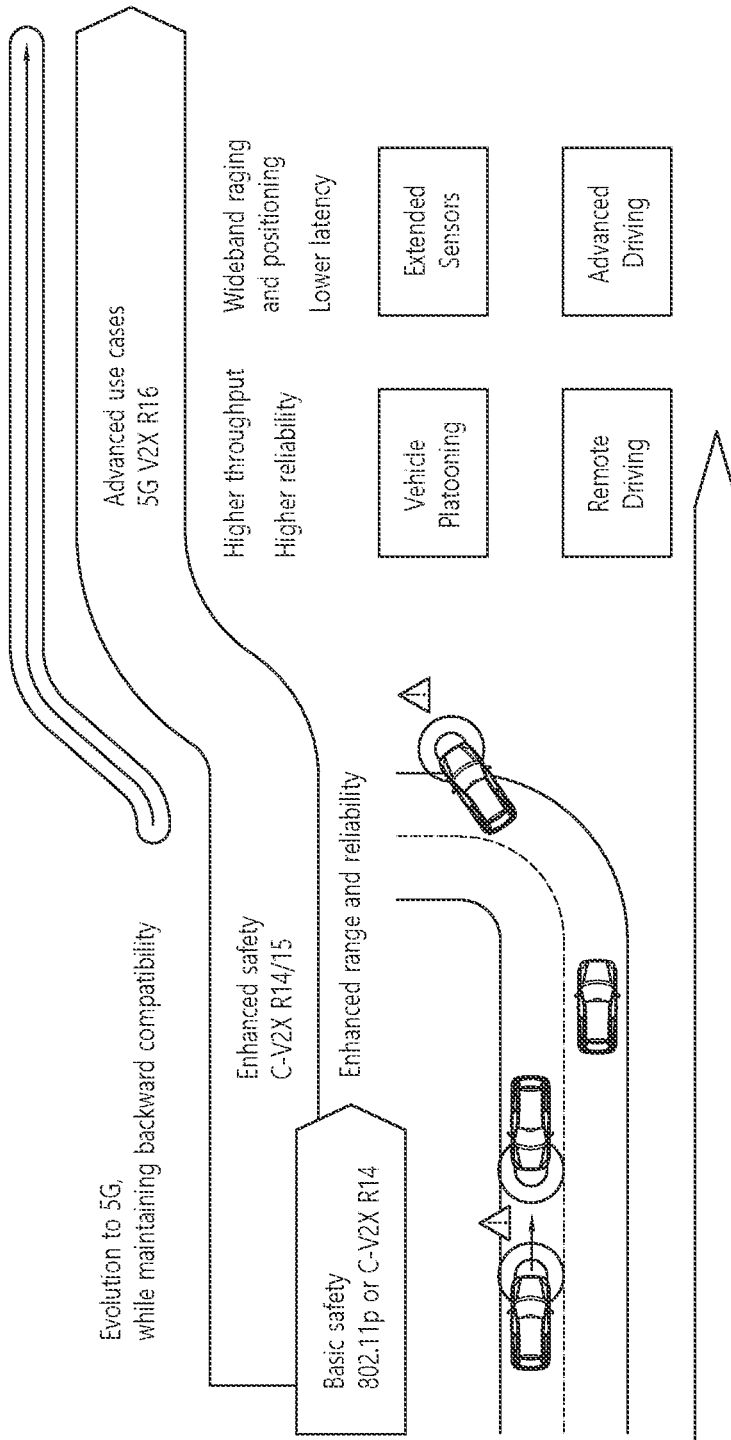
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
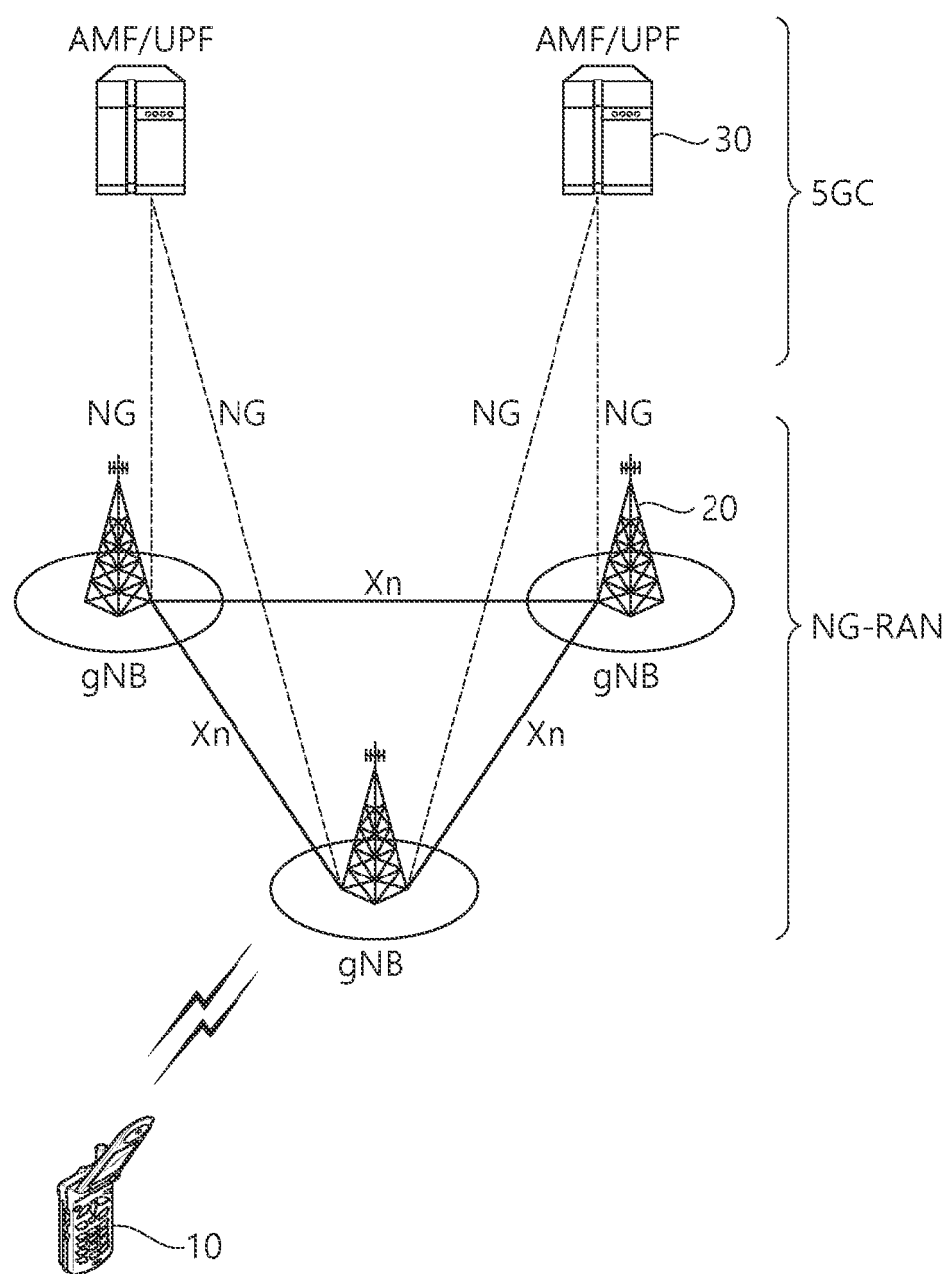
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
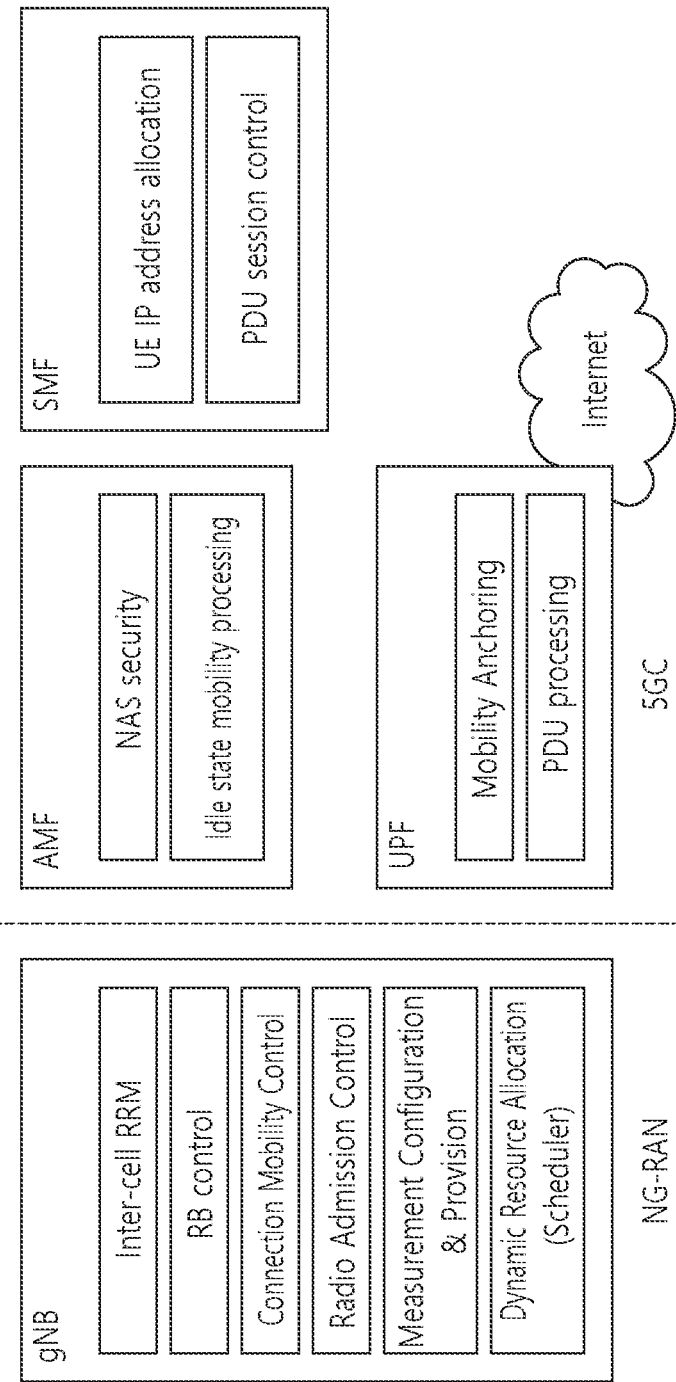
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(*a*) shows a radio protocol architecture for a user plane, and FIG. 4(*b*) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding sub-frame for a physical downlink control channel (PDCCH), i.e., an L1/L2 control channel. A transmission time interval (TTI) is a unit time of subframe transmission.

Figure 5:
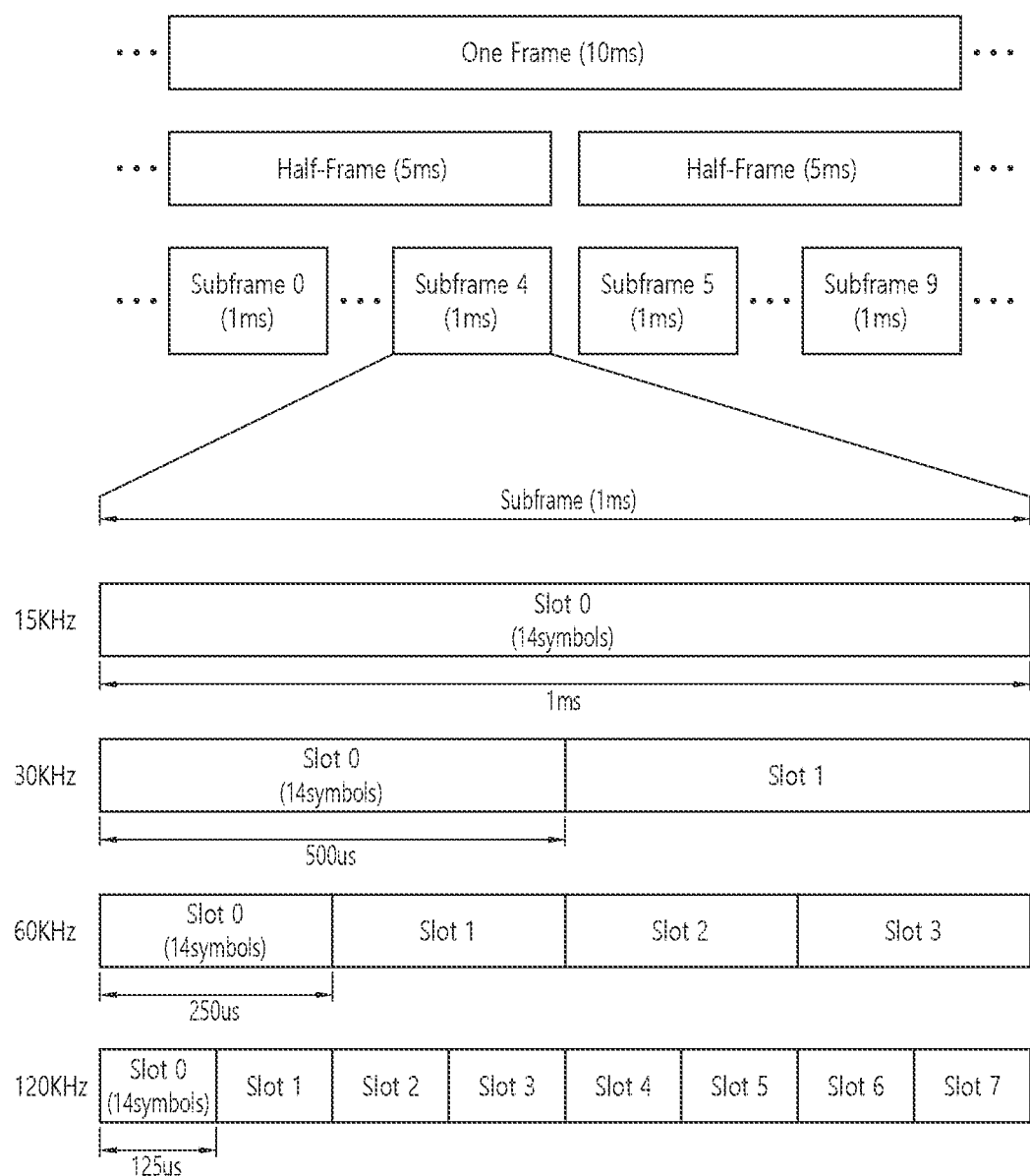
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
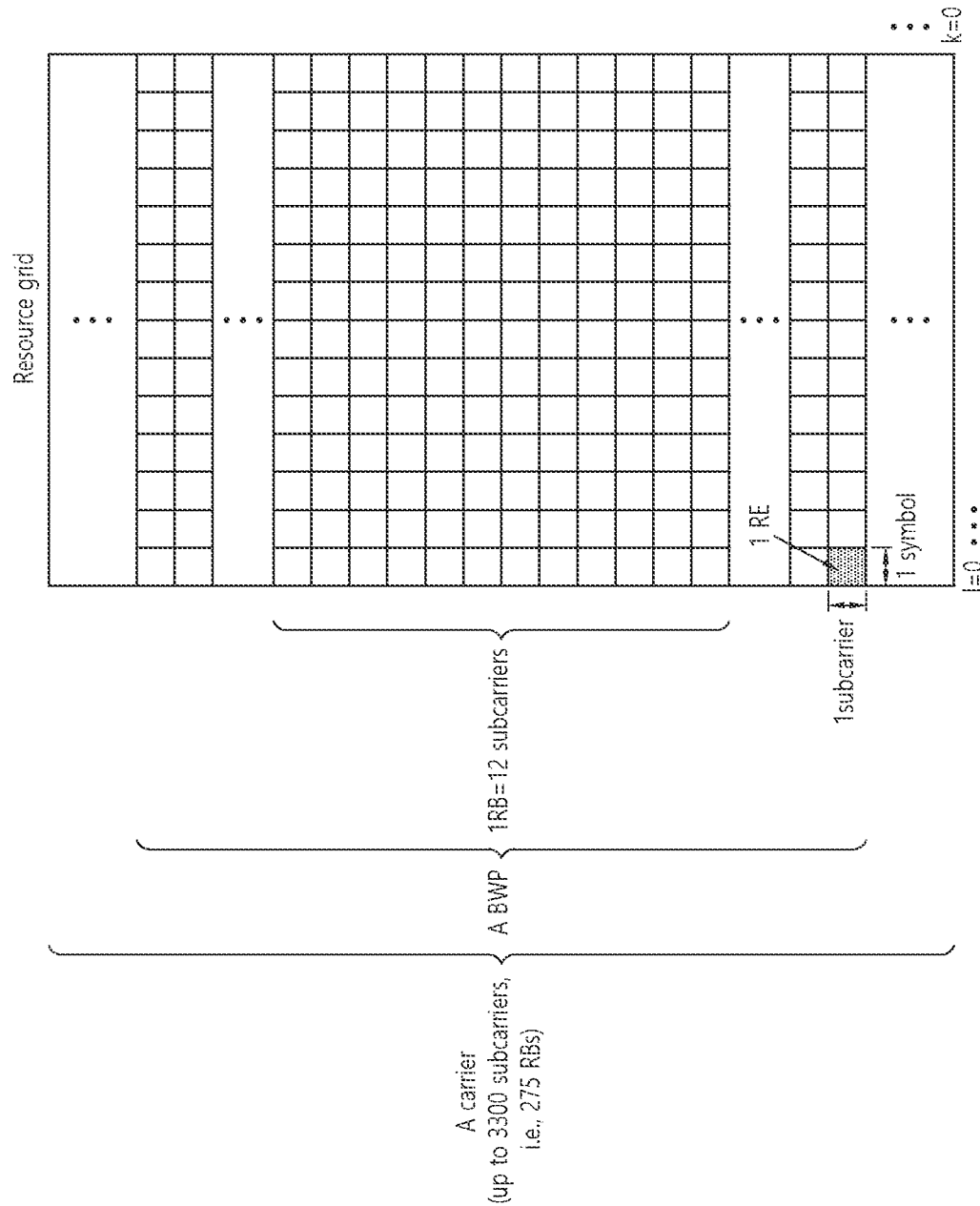
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
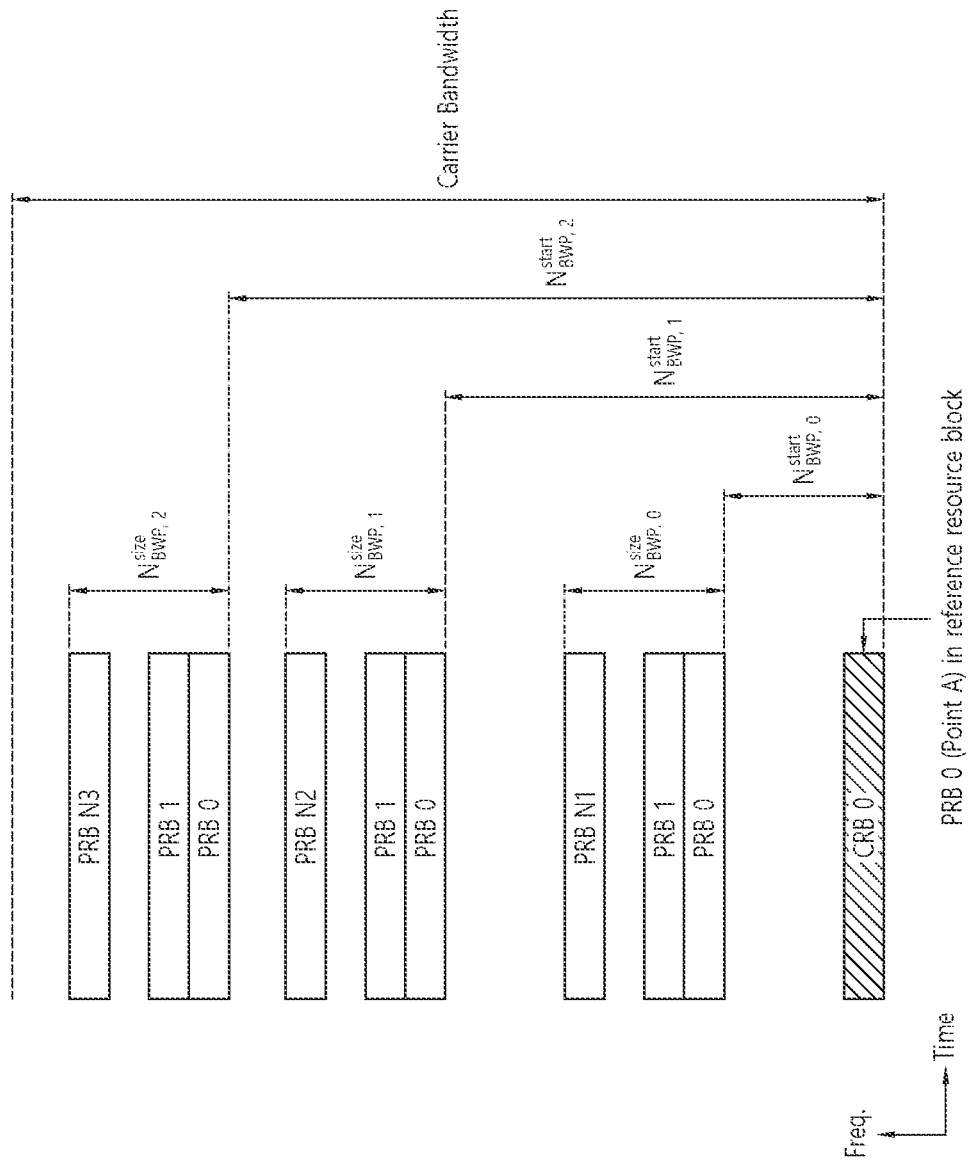
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
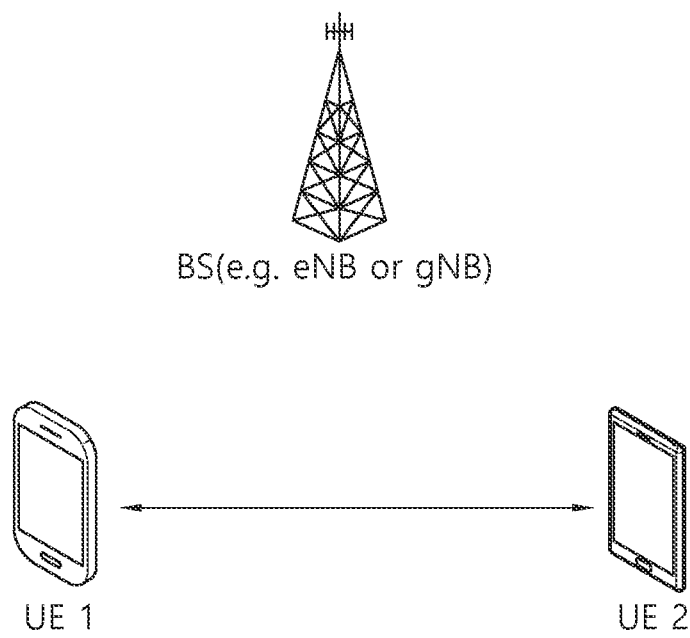
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
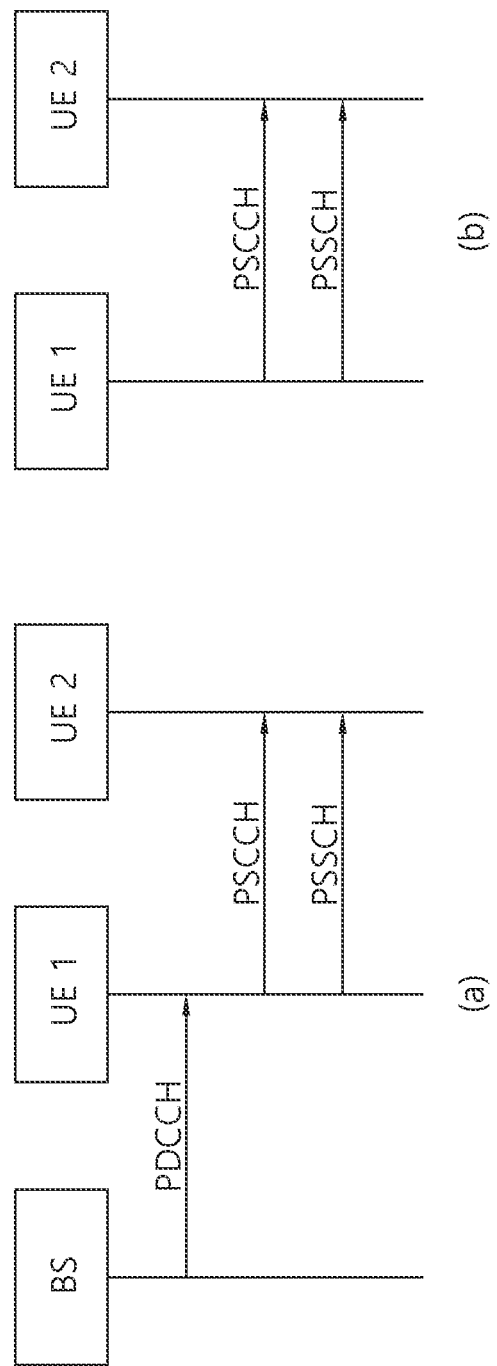
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
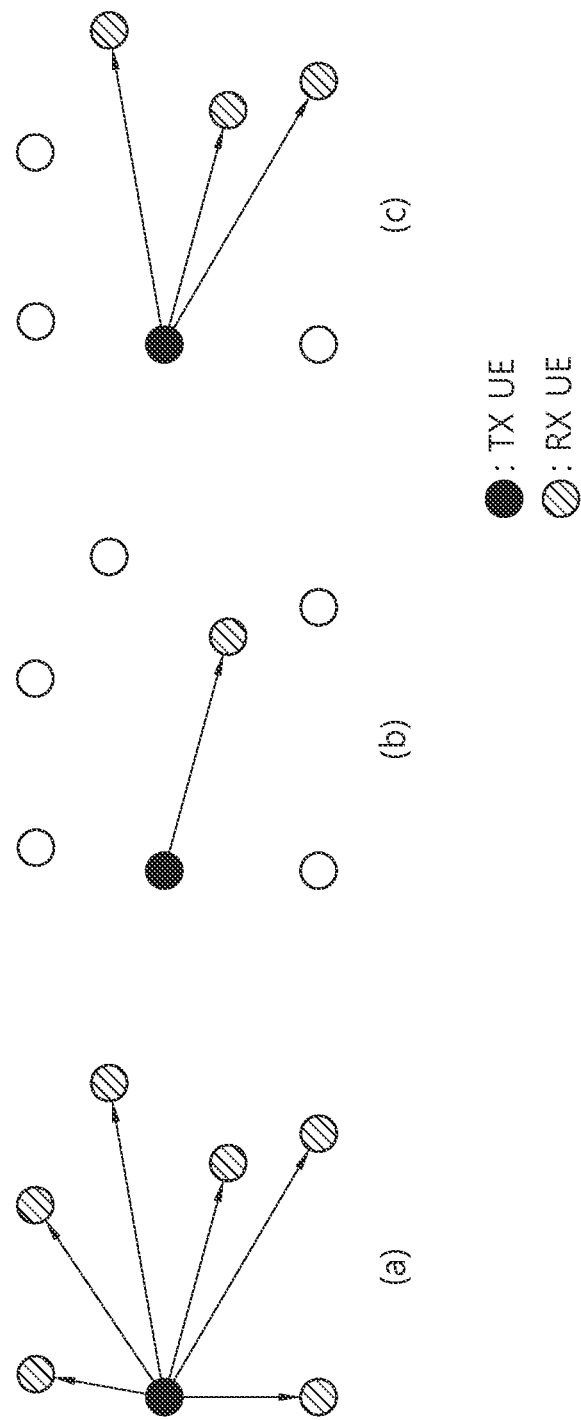
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
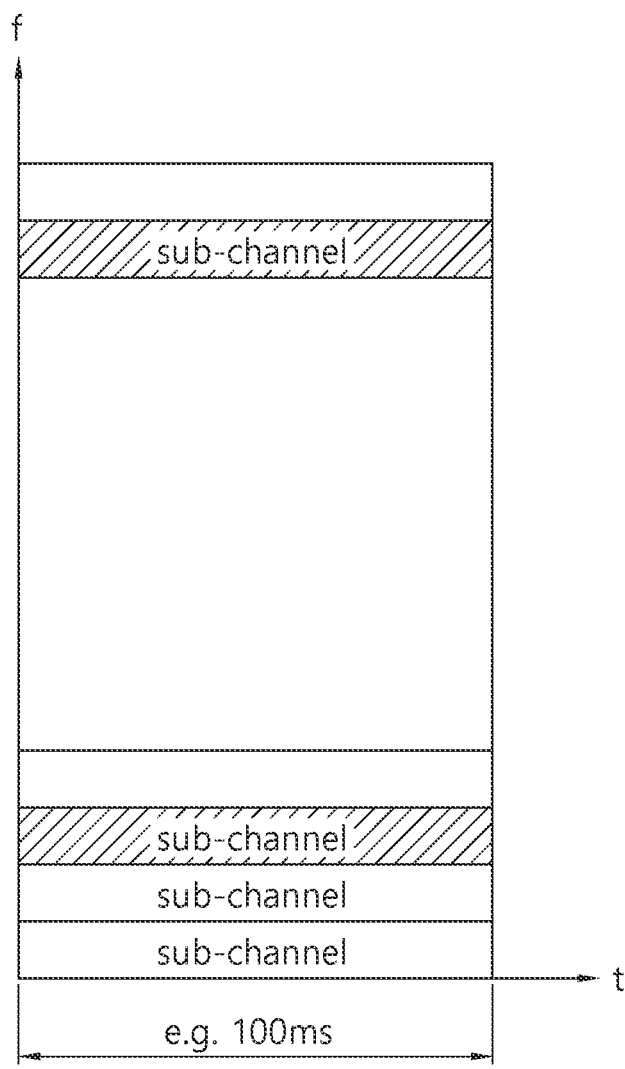
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Based on various embodiments of the present disclosure, a method for transmitting and/or receiving sidelink channel state information or sidelink measurement information and an apparatus supporting the same will be described.

Based on an embodiment of the present disclosure, a UE may transmit at least one of the following information through a SCI.

resource allocation information, e.g., resource allocation information related to a PSSCH and/or a PSCCH, e.g., location and/or number of time resources and/or frequency resources, and/or resource reservation information, e.g., resource reservation information related to a PSSCH and/or a PSCCH, e.g., a period of resource reservation, and/or information for requesting a report of SL CSI, e.g., information for requesting a report of SL RSRP information, information for requesting a report of SL RSRQ information, and/or information for requesting a report of SL RSSI information, and/or SL CSI transmission information, e.g., information indicating transmission of SL CSI on a PSSCH, e.g., information indicating transmission of SL RSRP information, information indicating transmission of SL RSRQ information, and/or information indicating transmission of SL RSSI information, and/or modulation coding scheme (MCS) information, and/or information related to transmit power, and/or information related to L1 destination ID and/or information related to L1 source ID, and/or SL HARQ process ID information, and/or new data indicator (NDI) information, and/or redundancy version (RV) information, and/or QoS information (e.g., priority), e.g., related traffic and/or packet(s) to be transmitted, and/or SL CSI-RS transmission indicator or information on the number of antenna ports related to (transmitted) SL CSI-RS, and/or information related to a location of a transmitting UE, and/or information related to a location of a target receiving UE (for which SL HARQ feedback is requested), and/or information related to a communication range of a target receiving UE (for which SL HARQ feedback is requested), and/or information related to pattern(s) of reference signal(s) (e.g., DM-RS) used for channel estimation and/or decoding of data on a PSSCH, e.g., information related to time pattern(s) and/or frequency pattern(s) of reference signal(s) used for channel estimation and/or decoding of data on a PSSCH;

In the present disclosure, for example, "configuration" or "definition" may mean (pre-)configuration from base station(s) or network(s). For example, "configuration" or "definition" may mean resource pool specific (pre-)configuration from base station(s) or network(s). For example, base station(s) or network(s) may transmit information related to "configuration" or "definition" to UE(s). For example, base station(s) or network(s) may transmit information related to "configuration" or "definition" to UE(s) through pre-defined signaling. For example, the pre-defined signaling may include at least one of RRC signaling, MAC signaling, PHY signaling, and/or SIB.

In the present disclosure, SL CSI may include at least one of a channel quality indicator (CQI), a precoding matrix indicator (PMI), and/or a rank indicator (RI). For example, SL measurement information may include at least one of SL reference signal received power (RSRP), SL reference signal received quality (RSRQ), and/or SL received signal strength indicator (RSSI).

In the present disclosure, "PSCCH" may be replaced with "SCI", or vice versa. For example, since a UE may transmit a SCI through a PSCCH, "PSCCH" may be replaced with "SCI", or vice versa.

In the present disclosure, a SCI may be at least one of a first SCI and a second SCI. For example, in consideration of a (relatively) high payload size of a SCI, a UE may divide fields constituting the SCI into two groups and transmit them. For example, a UE may divide fields constituting the SCI into two groups and transmit them through different channels. For example, the UE may transmit a first SCI through a PSCCH. For example, the UE may piggyback a second SCI on a PSSCH and transmit a second SCI together with data. For example, a UE may transmit a second SCI through a (independent) PSCCH. For example, piggyback may mean that control information (e.g., SCI) is transmitted through a data channel.

Figure 13:
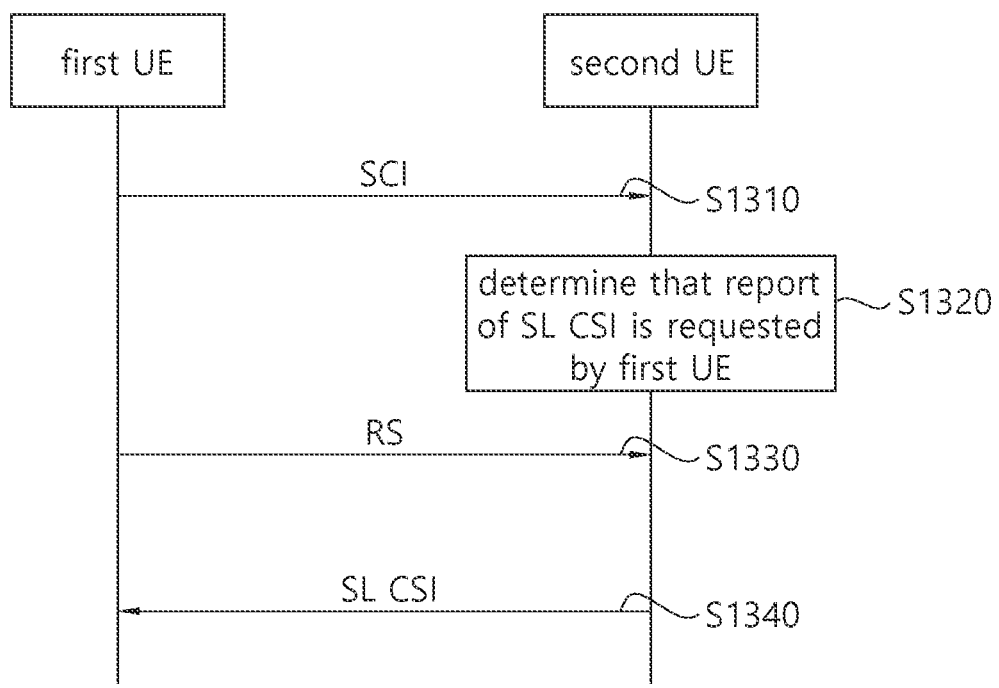
FIG. 13 shows a procedure for a UE to request a report of SL CSI and/or a report of SL measurement information through a SCI, based on an embodiment of the present disclosure.

FIG. 13 shows a procedure for a UE to request a report of SL CSI and/or a report of SL measurement information through a SCI, based on an embodiment of the present disclosure. The embodiment of FIG. 13 may be combined with various embodiments of the present disclosure.

Referring to FIG. 13, in step S1310, a first UE may transmit a SCI to a second UE. For example, based on the following rule(s), the first UE may request the second UE to report SL CSI and/or SL measurement information by transmitting the SCI including a pre-defined field.

For example, a field related to requesting a report of SL CSI (hereinafter, SL CSI report request field) and a field related to requesting a report of SL measurement information (hereinafter, SL measurement information report request field) may be defined independently or separately. For example, the SL CSI report request field and the SL measurement information report request field may be defined independently or separately in the SCI.

For example, one field related to requesting a report of SL CSI and requesting a report of SL measurement information may be defined. For example, one field related to requesting a report of SL CSI and requesting a report of SL measurement information may be defined in the SCI. In this case, for example, the first UE may simultaneously request the second UE to report two pieces of information (i.e., SL CSI and SL measurement information) by using one field included in the SCI. For example, the form in which a report of SL CSI and a report of SL measurement information are simultaneously requested based on one field included in the SCI may be useful if the first UE is configured to always request the report of SL CSI and the report of SL measurement information together.

For example, one field related to requesting a report of SL CSI and requesting a report of SL measurement information may be defined. For example, one field related to requesting a report of SL CSI and requesting a report of SL measurement information may be defined in the SCI. In this case, the one field may indicate/represent a plurality of states. For example, among the plurality of states, some states may indicate/represent the SL CSI report request, and other states may indicate/represent the SL measurement information report request. In this case, for example, the first UE may request the second UE to report of at least one of two pieces of information (i.e., SL CSI and SL measurement information) by using one field included in the SCI.

For example, the first UE may simultaneously inform the second UE whether or not to transmit SL CSI-RS(s) and whether or not to request a report of SL CSI based on one field defined in the SCI. Herein, for example, if the first UE informs the second UE of transmission of SL CSI-RS(s) based on the field included in the SCI, the second UE may interpret or determine (implicitly) that a report of SL CSI is requested by the first UE based on the field. For example, if the first UE transmits the SCI including the field indicating/representing transmission of SL CSI-RS(s) to the second UE, in step S1320, the second UE may (implicitly) determine that a report of SL CSI is requested by the first UE based on the field even if the first UE does not (separately) request the second UE to report SL CSI. For example, the field indicating/representing transmission of SL CSI-RS(s) may be a field included in a second SCI transmitted through a PSSCH. For example, the second SCI may be scheduled by a first SCI transmitted through a PSCCH. For example, the second SCI may be defined as shown in Table 5. For example, in the embodiment of Table 5, SCI format 0-2 may be the second SCI, and SCI format 0-1 may be the first SCI. The embodiment of Table 5 is only an example of the second SCI, and the second SCI may be defined in various forms.

TABLE 5

SCI format 0-2 is used for the decoding of PSSCH.
The following information is transmitted by means of the SCI format 0-2:
HARQ Process ID
New data indicator
Redundancy version
Source ID
Destination ID
CSI request
If the 2nd-stage SCI format field in the corresponding SCI format 0-1 indicates type 1 groupcast, the following fields are present
Zone ID
Communication range requirement Referring to Table 5, the second SCI may include a 'CSI request' field. For example, the 'CSI request' field may be a field indicating/representing whether or not SL CSI-RS(s) is transmitted. For example, if the first UE sets the 'CSI request' field to 1 and transmits the second SCI to the second UE, the second UE may determine that the first UE transmits SL CSI-RS(s), and furthermore, the second UE may determine that the first UE requests a report of SL CSI. That is, although the first UE only indicates/represents transmission of SL CSI-RS(s) to the second UE based on the field, the second UE may trigger a report of SL CSI for the first UE based on the field. Accordingly, the second UE may obtain SL CSI based on SL CSI-RS(s) transmitted by the first UE, and the second UE may transmit the SL CSI to the first UE. For example, only if the 'CSI request' field included in the second SCI is set to 1, the first UE may transmit SL CSI-RS(s) to the second UE. For example, only if the 'CSI request' field included in the first SCI is set to 1, the first UE may transmit SL CSI-RS(s) to the second UE. For example, if the first UE sets the 'CSI request' field to 0 and transmits a SCI to the second UE, the second UE may determine that the first UE does not transmit SL CSI-RS(s), and furthermore, the second UE may determine that the first UE does not request a report of SL CSI.

For example, the first UE may simultaneously inform the second UE whether or not to transmit SL CSI-RS(s) and whether or not to request a report of SL measurement information based on one field defined in the SCI. Herein, for example, if the first UE informs the second UE of transmission of SL CSI-RS(s) based on the field included in the SCI, the second UE may interpret or determine (implicitly) that a report of SL measurement information is requested by the first UE based on the field. For example, if the first UE transmits the SCI including the field indicating/representing transmission of SL CSI-RS(s) to the second UE, in step S1320, the second UE may (implicitly) determine that a report of SL measurement information is requested by the first UE based on the field even if the first UE does not (separately) request the second UE to report SL measurement information.

For example, the first UE may simultaneously inform the second UE whether or not to transmit SL CSI-RS(s) and whether or not to request a report of SL CSI and SL measurement information based on one field defined in the SCI. Herein, for example, if the first UE informs the second UE of transmission of SL CSI-RS(s) based on the field included in the SCI, the second UE may interpret or determine (implicitly) that a report of SL CSI and SL measurement information is requested by the first UE based on the field. For example, if the first UE transmits the SCI including the field indicating/representing transmission of SL CSI-RS(s) to the second UE, in step S1320, the second UE may (implicitly) determine that a report of SL CSI and SL measurement information is requested by the first UE based on the field even if the first UE does not (separately) request the second UE to report SL CSI and SL measurement information.

For example, the first UE may simultaneously inform the second UE whether or not to transmit SL CSI-RS(s), whether or not to request a report of SL CSI, and the number of antenna ports related to (transmitted) SL CSI-RS(s), based on one field defined in the SCI. Herein, for example, if the first UE requests the second UE to report SL CSI based on the field included in the SCI, the second UE may (implicitly) interpret or determine that SL CSI-RS(s) is transmitted by the first UE in consideration of the number of antenna ports related to SL CSI-RS(s). For example, if the first UE requests the second UE to report SL CSI based on the field included in the SCI, the second UE may (implicitly) interpret or determine that SL CSI-RS(s) is transmitted by the first UE based on the number of antenna ports related to SL CSI-RS(s).

For example, the first UE may simultaneously inform the second UE whether or not to transmit SL CSI-RS(s), whether or not to request a report of SL measurement information, and the number of antenna ports related to (transmitted) SL CSI-RS(s), based on one field defined in the SCI. Herein, for example, if the first UE requests the second UE to report SL measurement information based on the field included in the SCI, the second UE may (implicitly) interpret or determine that SL CSI-RS(s) is transmitted by the first UE in consideration of the number of antenna ports related to SL CSI-RS(s). For example, if the first UE requests the second UE to report SL measurement information based on the field included in the SCI, the second UE may (implicitly) interpret or determine that SL CSI-RS(s) is transmitted by the first UE based on the number of antenna ports related to SL CSI-RS(s).

For example, the first UE may simultaneously inform the second UE whether or not to transmit SL CSI-RS(s), whether or not to request a report of SL CSI and SL measurement information, and the number of antenna ports related to (transmitted) SL CSI-RS(s), based on one field defined in the SCI. Herein, for example, if the first UE requests the second UE to report SL CSI and SL measurement information based on the field included in the SCI, the second UE may (implicitly) interpret or determine that SL CSI-RS(s) is transmitted by the first UE in consideration of the number of antenna ports related to SL CSI-RS(s). For example, if the first UE requests the second UE to report SL CSI and SL measurement information based on the field included in the SCI, the second UE may (implicitly) interpret or determine that SL CSI-RS(s) is transmitted by the first UE based on the number of antenna ports related to SL CSI-RS(s).

In the above-described embodiment, the number of antenna ports related to SL CSI-RS(s) may be pre-configured for the first UE. For example, the number of antenna ports related to SL CSI-RS(s) may be the maximum number of antenna ports allowed to transmit SL SCI-RS(s). For example, the number of antenna ports related to SL CSI-RS(s) may be the minimum number of antenna ports allowed to transmit SL SCI-RS(s). For example, the number of antenna ports related to SL CSI-RS(s) may be pre-configured for the first UE per a resource pool (i.e., resource pool specific). For example, the number of antenna ports related to SL CSI-RS(s) may be pre-configured for the first UE per a carrier (i.e., carrier specific). For example, the number of antenna ports related to SL CSI-RS(s) may be pre-configured for the first UE per a service (i.e., service specific).

In step S1330, the first UE may transmit reference signal(s) (RS(s)) to the second UE. For example, the RS(s) may be CSI-RS(s). For example, if the SCI transmitted by the first UE indicates/represents transmission of CSI-RS(s), the first UE may transmit CSI-RS(s) to the second UE.

In step S1340, the second UE may transmit SL CSI to the first UE. For example, the SL CSI may be obtained based on the RS(s). For example, the second UE receiving the SCI including the field indicating/representing transmission of CSI-RS(s) from the first UE may measure a channel state between the first UE and the second UE by using CSI-RS(s). In addition, the second UE may generate SL CSI related to the channel state and transmit the SL CSI to the first UE. For example, the second UE may generate SL CSI in a form of MAC CE and transmit the SL CSI to the first UE. For example, SL CSI may be transmitted through a MAC CE. For example, a MAC CE for reporting SL CSI may be referred to as a CSI Reporting MAC CE. For example, a priority of the CSI Reporting MAC CE may be defined as a fixed value. For example, a priority of the CSI Reporting MAC CE may be defined as 1. For example, a base station or a network may configure or pre-configure a priority of the CSI Reporting MAC CE to a fixed value for the UE. For example, a priority of the CSI Reporting MAC CE may be exchanged or designated between UEs through PC5-RRC signaling.

For example, the second UE may transmit SL measurement information to the first UE. For example, the SL measurement information may be obtained based on the RS(s). For example, the second UE receiving the SCI including the field indicating/representing transmission of CSI-RS(s) from the first UE may measure a channel state between the first UE and the second UE by using CSI-RS(s). In addition, the second UE may transmit SL measurement information related to the channel state to the first UE. For example, a priority of the SL measurement information may be defined as a fixed value. For example, a base station or a network may configure or pre-configure a priority of the SL measurement information to a fixed value for the UE. For example, a priority of the SL measurement information and a priority of the CSI Reporting MAC CE may be set/fixed to the same priority. For example, a priority of the SL measurement information may be exchanged or designated between UEs through PC5-RRC signaling. For example, a priority of the SL measurement information may be higher than a priority of SL data. For example, the second UE may transmit SL measurement information to the first UE through PC5-RRC connection/signaling. For example, a priority of the PC5-RRC signaling may be higher than a priority of the CSI Reporting MAC CE. For example, a priority of the CSI Reporting MAC CE may be higher than a priority of SL data. For example, in a logical channel prioritization (LCP) procedure, a priority of the PC5-RRC signaling may be higher than a priority of the CSI Reporting MAC CE, and a priority of the CSI Reporting MAC CE may be higher than a priority of SL data.

For example, the second UE may transmit SL CSI and/or SL measurement information to the first UE through a PSSCH or a pre-defined channel. For example, SL CSI and/or SL measurement information may be piggybacked on a PSSCH or a pre-defined channel and transmitted together with data (of a specific service). For convenience of description, a case in which SL CSI and/or SL measurement information is piggybacked on a PSSCH or a pre-defined channel and transmitted together with data may be referred to as a first case. For example, SL CSI and/or SL measurement information may be transmitted without data (of a specific service) through a PSSCH or a pre-defined channel. For convenience of description, a case in which SL CSI and/or SL measurement information is transmitted without data through a PSSCH or a pre-defined channel may be referred to as a second case. For example, in case the second UE transmits SL CSI and/or SL measurement information to the first UE through a PSSCH or a pre-defined channel, the second UE may inform the first UE whether or not to transmit SL CSI and/or whether or not to transmit SL measurement information through a pre-defined field included in a SCI. For example, in order to reduce complexity of blind decoding of the first UE, the second UE may inform the first UE whether or not to transmit SL CSI and/or whether or not to transmit SL measurement information through a pre-defined field included in a SCI. Herein, for example, a case in which SL CSI and/or SL measurement information is transmitted through a PSSCH without data and a case in which SL CSI and/or SL measurement information is piggybacked on a PSSCH and transmitted together with data may be distinguished based on a pre-defined field included in the SCI. For example, the pre-defined field included in the SCI may be 2 bits.

For example, a field related to whether or not to transmit SL CSI (hereinafter, SL CSI report field) and a field related to whether or not to transmit SL measurement information (hereinafter, SL measurement information report field) may be defined independently or separately. For example, the SL CSI report field and the SL measurement information report field may be defined independently or separately in the SCI.

For example, one field related to transmission of SL CSI and transmission of SL measurement information may be defined. For example, one field related to transmission of SL CSI and transmission of SL measurement information may be defined in the SCI. In this case, for example, the second UE may simultaneously inform the first UE whether or not to transmit two pieces of information (i.e., SL CSI and SL measurement information) by using one field included in the SCI. For example, the form in which whether or not SL CSI is transmitted and whether or not SL measurement information is transmitted are simultaneously informed based on one field included in the SCI may be useful if the second UE is configured to always transmit the report of SL CSI and the report of SL measurement information together.

For example, one field related to transmission of SL CSI and transmission of SL measurement information may be defined. For example, one field related to transmission of SL CSI and transmission of SL measurement information may be defined in the SCI. In this case, the one field may indicate/represent a plurality of states. For example, among the plurality of states, some states may indicate/represent transmission of SL CSI, and other states may indicate/represent transmission of SL measurement information. In this case, for example, the second UE may inform the first UE of transmission of at least one of two pieces of information (i.e., SL CSI and SL measurement information) by using one field included in the SCI.

Based on an embodiment of the present disclosure, a QoS field value included in a SCI, which schedules a PSSCH or a pre-defined channel in the first case and/or the second case, may be configured differently, based on at least one of the following rules, compared with a QoS field value related to a case in which the second UE transmits only data (of a specific service) through a PSSCH. For convenience of description, a case in which data (of a specific service) is only transmitted through a PSSCH may be referred to as a third case. For example, the SCI may be transmitted through a PSCCH. For example, the QoS field value may include a value related to priority information.

(1) First Rule

For example, compared to the third case, the second UE may designate or set a priority included in a SCI to a relatively high priority in the first case. For example, compared to the third case, the second UE may designate or set a priority included in a SCI to a relatively high pre-configured priority in the first case. For example, compared to the third case, the second UE may designate or set a priority included in a SCI to a relatively high priority by applying a pre-configured offset value in the first case.

For example, compared to the third case, the second UE may designate or set a priority included in a SCI to a relatively high priority in the second case. For example, compared to the third case, the second UE may designate or set a priority included in a SCI to a relatively high pre-configured priority in the second case. For example, compared to the third case, the second UE may designate or set a priority included in a SCI to a relatively high priority by applying a pre-configured offset value in the second case.

For example, the second UE may designate or set a priority included in a SCI in the first case to be the same as a priority included in a SCI in the second case. For example, in the first case and the second case, the second UE may designate or set a priority included in a SCI to the same pre-configured priority.

For example, compared to remaining case(s), the second UE may designate or set a priority included in a SCI to the highest priority in the first case. For example, compared to remaining case(s), the second UE may designate or set a priority included in a SCI to the highest pre-configured priority in the first case. For example, compared to remaining case(s), the second UE may designate or set a priority included in a SCI to the highest priority by applying a pre-configured offset value in the first case.

For example, compared to remaining case(s), the second UE may designate or set a priority included in a SCI to the highest priority in the second case. For example, compared to remaining case(s), the second UE may designate or set a priority included in a SCI to the highest pre-configured priority in the second case. For example, compared to remaining case(s), the second UE may designate or set a priority included in a SCI to the highest priority by applying a pre-configured offset value in the second case.

(2) Second Rule

For example, the second UE may designate or set a priority included in a SCI in the first case to be the same as a priority included in a SCI in the third case. For example, a priority included in a SCI in the first case may be set to follow a priority of data related to a specific service or a priority of data related to a specific service transmitted through (unicast) session(s) in the third case. For example, a priority included in a SCI in the first case may be set to follow the highest priority of data related to a specific service transmitted through (unicast) session(s). For example, a priority included in a SCI in the first case may be set to follow the lowest priority of data related to a specific service transmitted through (unicast) session(s). For example, a priority included in a SCI in the first case may be set to follow an average of priorities of data related to specific services transmitted through (unicast) session(s).

For example, the second UE may designate or set a priority included in a SCI in the second case to be the same as a priority included in a SCI in the third case. For example, a priority included in a SCI in the second case may be set to follow a priority of data related to a specific service or a priority of data related to a specific service transmitted through (unicast) session(s) in the third case. For example, a priority included in a SCI in the second case may be set to follow the highest priority of data related to a specific service transmitted through (unicast) session(s). For example, a priority included in a SCI in the second case may be set to follow the lowest priority of data related to a specific service transmitted through (unicast) session(s). For example, a priority included in a SCI in the second case may be set to follow an average of priorities of data related to specific services transmitted through (unicast) session(s).

For example, the second UE may designate or set a priority included in a SCI to a pre-configured priority in the first case. For example, a value related to the priority may be set differently based on at least one of a type of a service, a requirement (e.g., latency, reliability), a congestion level, SL quality, and/or a value of SL measurement.

For example, the second UE may designate or set a priority included in a SCI to a pre-configured priority in the second case. For example, a value related to the priority may be set differently based on at least one of a type of a service, a requirement (e.g., latency, reliability), a congestion level, SL quality, and/or a value of SL measurement.

Based on an embodiment of the present disclosure, the second UE may differently designate or set a QoS field value included in a SCI related to transmission of SL CSI and a QoS field value included in a SCI related to transmission of SL measurement information. For example, the second UE may differently designate or set a QoS field value included in a SCI related to transmission of SL CSI and a QoS field value included in a SCI related to transmission of SL measurement information, and may transmit the SCI to the first UE. For example, the QoS field value may include a value related to priority information. For example, the second UE may set a priority related to transmission of the SL CSI to a relatively high priority, compared to a priority related to transmission of the SL measurement report. For example, the second UE may set a priority related to transmission of the SL measurement report to a relatively high priority, compared to a priority related to transmission of the SL CSI. For example, the second UE may set a priority related to transmission of the SL measurement report to a relatively high priority or the same priority, compared to a priority related to transmission of the SL CSI. For example, in a logical channel prioritization (LCP) procedure, the second UE may set a priority of a logical channel related to transmission of the SL measurement report to a relatively high priority, compared to a priority related to transmission of the SL CSI. For example, the logical channel may be a sidelink transport channel (STCH).

For example, the second UE may set a priority related to transmission of SL data to a relatively low priority or the same priority, compared to a priority related to transmission of the SL CSI. For example, in a logical channel prioritization (LCP) procedure, the second UE may set a priority of a logical channel related to transmission of SL data to a relatively low priority, compared to a priority related to transmission of the SL CSI.

For example, the second UE may set a priority related to transmission of SL data to a relatively low priority or the same priority, compared to a priority related to transmission of the SL measurement information. For example, in a logical channel prioritization (LCP) procedure, the second UE may set a priority of a logical channel related to transmission of SL data to a relatively low priority, compared to a priority of a logical channel related to transmission of the SL measurement information.

For example, the second UE may differently designate or set a QoS field value included in a SCI related to simultaneous transmission of SL CSI and SL measurement information and a QoS field value included in a SCI related to transmission of SL CSI. For example, the second UE may differently designate or set a QoS field value included in a SCI related to simultaneous transmission of SL CSI and SL measurement information and a QoS field value included in a SCI related to transmission of SL CSI, and may transmit the SCI to the first UE. For example, the QoS field value may include a value related to priority information.

For example, the second UE may differently designate or set a QoS field value included in a SCI related to simultaneous transmission of SL CSI and SL measurement information and a QoS field value included in a SCI related to transmission of SL measurement information. For example, the second UE may differently designate or set a QoS field value included in a SCI related to simultaneous transmission of SL CSI and SL measurement information and a QoS field value included in a SCI related to transmission of SL measurement information, and may transmit the SCI to the first UE. For example, the QoS field value may include a value related to priority information.

Based on an embodiment of the present disclosure, the first UE may designate or set differently a QoS field value included in a SCI related to a PSSCH when SL CSI-RS(s) is transmitted through the PSSCH and a QoS field value included in a SCI related to a PSSCH when only PSSCH is transmitted without SL CSI-RS(s). In addition, the first UE may transmit the SCI including the differently set QoS field to the second UE. For example, the QoS field value may include a value related to priority information. For example, the first UE may set a priority related to transmission of a PSSCH including SL CSI-RS(s) to a relatively high priority, compared to a priority related to transmission of a PSSCH not including SL CSI-RS(s).

For example, the first UE may designate or set differently a QoS field value included in a SCI related to a PSSCH when SL CSI-RS(s) is transmitted through the PSSCH and a QoS field value included in a SCI related to a PSSCH when only data (of a specific service) is transmitted through the PSSCH. In addition, the first UE may transmit the SCI including the differently set QoS field to the second UE. For example, the QoS field value may include a value related to priority information. For example, the first UE may set a priority related to transmission of a PSSCH including only SL CSI-RS(s) to a relatively high priority, compared to a priority related to transmission of a PSSCH including only data.

Based on an embodiment of the present disclosure, if at least one of the following conditions is satisfied, the second UE may trigger transmission of the SL CSI report request and/or transmission of the SL measurement information report request by the first UE through pre-defined signaling. For example, if at least one of the following conditions is satisfied, the second UE may trigger transmission of SL CSI-RS(s) by the first UE through pre-defined signaling. For example, the pre-defined signaling may include at least one of MAC signaling and RRC signaling. For example, if at least one of the following conditions is satisfied, the second UE may transmit SL CSI and/or SL measurement information to the first UE.

(1) First Condition

For example, if a value of SL channel busy ratio (CBR) measured/reported by the second UE is changed by more than (or equal to) a pre-configured threshold value, compared to a value measured/reported previously, or For example, if a value of SL CBR measured/reported by the second UE is greater than a pre-configured threshold value, or For example, if a value of SL CBR measured/reported by the second UE is smaller than a pre-configured threshold value (2) Second Condition For example, if a value of SL interference measurement measured/reported by the second UE is changed by more than (or equal to) a pre-configured threshold value, compared to a value measured/reported previously, or For example, if a value of SL interference measurement measured/reported by the second UE is greater than a pre-configured threshold value, or For example, if a value of SL interference measurement measured/reported by the second UE is smaller than a pre-configured threshold value (3) Third Condition For example, if SL measurement information (for the first UE) reported/measured by the second UE is changed by more than (or equal to) a pre-configured threshold value, compared to a value reported/measured previously, herein, the SL measurement information may be at least one of SL RSRP, SL RSRQ and/or SL RSSI, or For example, if SL measurement information (for the first UE) reported/measured by the second UE is greater than a pre-configured threshold value, for example, if a value of SL RSRP between the first UE and the second UE measured by the second UE is greater than a pre-configured threshold value, or For example, if SL measurement information (for the first UE) reported/measured by the second UE is smaller than a pre-configured threshold value, for example, if a value of SL RSRP between the first UE and the second UE measured by the second UE is smaller than a pre-configured threshold value (4) Fourth Condition For example, if SL CSI (for the first UE) reported/measured by the second UE is changed by more than (or equal to) a pre-configured threshold value, compared to a value reported/measured previously, herein, the SL CSI may be at least one of SL CQI, SL PMI and/or SL RI, or For example, if SL CSI (for the first UE) reported/measured by the second UE is greater than a pre-configured threshold value, or For example, if SL CSI (for the first UE) reported/measured by the second UE is smaller than a pre-configured threshold value Based on an embodiment of the present disclosure, there may be no data (related to a specific service) to be transmitted by the first UE to the second UE. In this case, if the first UE needs to transmit SL CSI-RS(s) to the second UE, the first UE may transmit SL CSI-RS(s) to the second UE through a PSSCH, and the first UE may transmit dummy data information to the second UE through the PSSCH. For example, the first UE may transmit the dummy data information to the second UE through the PSSCH by rate matching or puncturing. For example, the SL CSI-RS(s) may be transmitted based on pre-configured resource(s) and/or MCS. For example, the pre-configured resource(s) may include pre-configured time resource(s) and/or pre-configured frequency resource(s). For example, the dummy data information may be transmitted on remaining resource(s) (e.g., time resource(s) and/or frequency resource(s)) in which SL CSI-RS(s) is not transmitted. For example, the dummy data information may be pre-configured information.

Additionally, for example, the first UE may inform the second UE whether or not to transmit the dummy data information through a SCI related to the PSSCH. For example, the first UE may inform the second UE whether or not the form/type is transmitted through a SCI related to the PSSCH. Through this, the first UE can prevent the second UE from transmitting meaningless SL HARQ feedback to the first UE.

For example, rate matching may refer to a process of matching the number of encoded bits to the number of bits required for transmission, by repeating or puncturing according to a rate matching pattern before a UE transmits the number of encoded bits. For example, the UE may repeat or puncture according to a rate matching pattern (on remaining (time/frequency) resource(s) in which SL CSI-RS(s) is not transmitted) on the corresponding PSSCH, and may transmit SL CSI-RS(s).

Based on an embodiment of the present disclosure, when the first UE performs SL CSI-RS transmission to the second UE, the first UE may inform the second UE whether or not transmit power of SL CSI-RS(s) is changed through pre-defined signaling. For example, the second UE may measure or obtain SL CSI and/or SL measurement information by using the SL CSI-RS(s). For example, if session(s) is established or set up between the first UE and the second UE, the pre-defined signaling may be PC5 RRC signaling. For example, the pre-defined signaling may be MAC signaling. For example, the pre-defined signaling may be a pre-defined field included in a SCI. In this case, for example, the first UE may inform the second UE that transmit power of SL CSI-RS(s) is changed compared to previous transmit power, based on toggling of a value of the pre-defined field included in the SCI.

For example, when the first UE performs SL CSI-RS transmission to the second UE, the first UE may transmit information on changed transmit power of SL CSI-RS(s) to the second UE through pre-defined signaling. For example, when the first UE performs SL CSI-RS transmission to the second UE, the first UE may transmit information on a time period in which transmit power of SL CSI-RS(s) is constantly kept/maintained to the second UE through pre-defined signaling.

In the above-described case, for example, the second UE may be configured to separate measurement/averaging operation for SL CSI-RSs with different transmission power values. For example, the measurement/averaging operation may include at least one of interference measurement/averaging operation (based on SL CSI-RS(s)), quality measurement/averaging operation for desired signal(s), and/or averaging operation for SL measurement. Also, for example, if resource(s) (e.g., resource(s) to be used for SL communication between the first UE and the second UE) is reselected, the second UE may initialize a value obtained based on existing measurement/averaging operation, and the second UE may newly perform measurement/averaging operation. For example, the second UE may newly perform measurement/averaging operation based on SL CSI-RS(s) transmitted through reselected resource(s). For example, based on interference measurement/averaging operation, the second UE may measure interference for a plurality of resource elements, and the second UE may obtain an average value of the measured interference.

Figure 14:
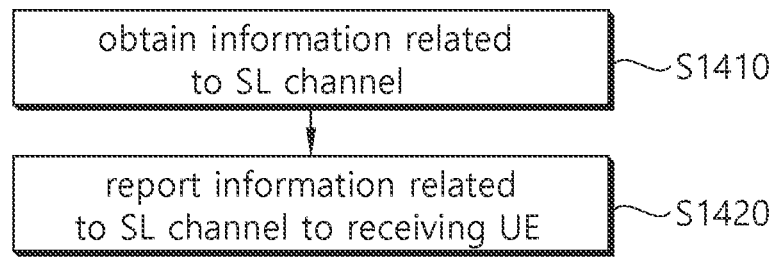
FIG. 14 shows a method for a transmitting UE to transmit information related to a SL channel, based on an embodiment of the present disclosure.

FIG. 14 shows a method for a transmitting UE to transmit information related to a SL channel, based on an embodiment of the present disclosure. The embodiment of FIG. 14 may be combined with various embodiments of the present disclosure.

Referring to FIG. 14, in step S1410, a transmitting UE may obtain information related to a SL channel. In step S1420, the transmitting UE may report information related to the SL channel to a receiving UE. The information related to the SL channel may include at least one of SL channel state information or SL measurement information. The receiving UE may receive information related to the SL channel from the transmitting UE. Additionally, the transmitting UE may perform synchronization with a synchronization source. Additionally, the transmitting UE may configure at least one BWP.

Figure 15:
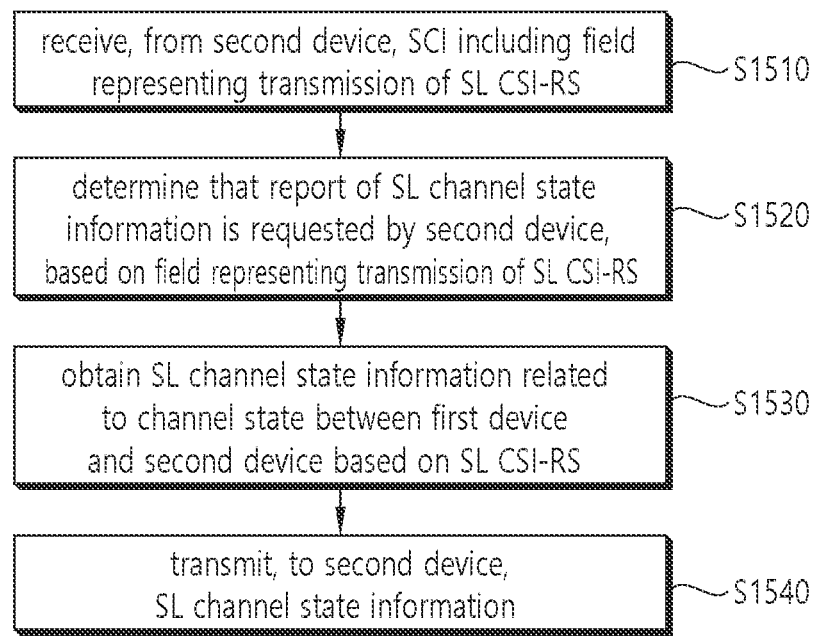
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, a first device may receive, from a second device, sidelink control information (SCI) including a field representing transmission of a sidelink (SL) channel state information reference signal (CSI-RS).

In step S1520, the first device may determine that a report of SL channel state information is requested by the second device, based on the field representing transmission of the SL CSI-RS.

In step S1530, the first device may obtain the SL channel state information related to a channel state between the first device and the second device based on the SL CSI-RS.

In step S1540, the first device may transmit, to the second device, the SL channel state information.

For example, the SL channel state information may include at least one of a channel quality indicator (CQI), a precoding matrix indicator (PMI), or a rank indicator (RI). For example, the SL channel state information may be transmitted to the second device through a first PSSCH. For example, a priority of the SL channel state information transmitted through the first PSSCH may be pre-configured. For example, the priority of the SL channel state information transmitted through the first PSSCH may be higher than a priority of data transmitted through a second PSSCH. For example, a priority field included in a SCI transmitted through a PSCCH related to the first PSSCH may be set to a value related to a higher priority, compared to a priority field included in a SCI transmitted through a PSCCH related to the second PSSCH. Herein, the first PSSCH may not include data, and the second PSSCH may not include SL channel state information.

Additionally, for example, the first device may transmit, to the second device, SL measurement information. For example, the SL measurement information may include at least one of reference signal received power (RSRP), reference signal received quality (RSRQ), or received signal strength indicator (RSSI) between the first device and the second device. For example, a priority of the SL measurement information may be pre-configured. For example, the priority of the SL measurement information may be higher than a priority of SL data. For example, a priority of the SL channel state information may be lower than a priority of the SL measurement information, and the priority of the SL channel state information may be higher than a priority of SL data.

For example, the SL measurement information may be transmitted to the second device, based on reference signal received power (RSRP) between the first device and the second device measured by the first device being greater than a threshold value. For example, the SL measurement information may be transmitted to the second device, based on reference signal received power (RSRP) between the first device and the second device measured by the first device is smaller than a threshold value. For example, the SL measurement information may be transmitted to the second device, based on a first reference signal received power (RSRP) between the first device and the second device measured or reported by the first device being changed by more than a pre-configured threshold value, compared to a second RSRP measured or reported previously.

The proposed method can be applied to device(s) described below. First, the processor (102) of the first device (100) may control the transceiver (106) to receive, from a second device, sidelink control information (SCI) including a field representing transmission of a sidelink (SL) channel state information reference signal (CSI-RS). In addition, the processor (102) of the first device (100) may determine that a report of SL channel state information is requested by the second device, based on the field representing transmission of the SL CSI-RS. In addition, the processor (102) of the first device (100) may obtain the SL channel state information related to a channel state between the first device and the second device based on the SL CSI-RS. In addition, the processor (102) of the first device (100) may control the transceiver (106) to transmit, to the second device, the SL channel state information.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device, sidelink control information (SCI) including a field representing transmission of a sidelink (SL) channel state information reference signal (CSI-RS); determine that a report of SL channel state information is requested by the second device, based on the field representing transmission of the SL CSI-RS; obtain the SL channel state information related to a channel state between the first device and the second device based on the SL CSI-RS; and transmit, to the second device, the SL channel state information.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a second UE, sidelink control information (SCI) including a field representing transmission of a sidelink (SL) channel state information reference signal (CSI-RS); determine that a report of SL channel state information is requested by the second UE, based on the field representing transmission of the SL CSI-RS; obtain the SL channel state information related to a channel state between the first UE and the second UE based on the SL CSI-RS; and transmit, to the second UE, the SL channel state information.

Based on an embodiment of the present disclosure, a non-transitory computer-readable storage medium storing instructions may be provided. For example, the instructions, when executed, may cause a first device to: receive, from a second device, sidelink control information (SCI) including a field representing transmission of a sidelink (SL) channel state information reference signal (CSI-RS); determine that a report of SL channel state information is requested by the second device, based on the field representing transmission of the SL CSI-RS; obtain the SL channel state information related to a channel state between the first device and the second device based on the SL CSI-RS; and transmit, to the second device, the SL channel state information.

Figure 16:
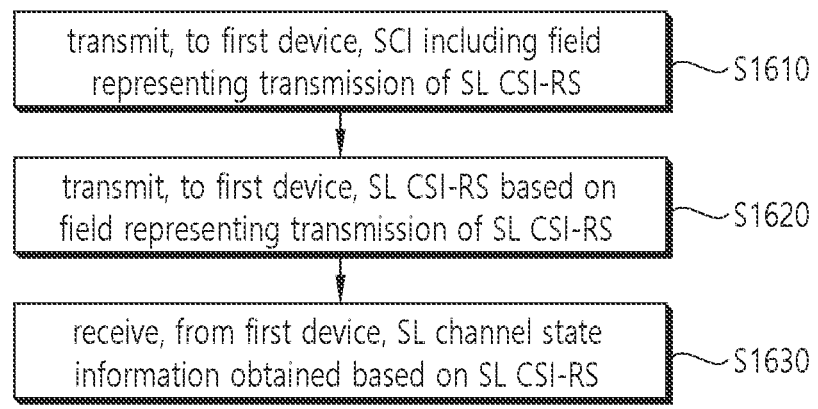
FIG. 16 shows a method for a second device to perform wireless communication, based on an embodiment of the present disclosure.

FIG. 16 shows a method for a second device to perform wireless communication, based on an embodiment of the present disclosure. The embodiment of FIG. 15 may be combined with various embodiments of the present disclosure.

Referring to FIG. 16, in step S1610, a second device may transmit, to a first device, sidelink control information (SCI) including a field representing transmission of a sidelink (SL) channel state information reference signal (CSI-RS). In step S1620, the second device may transmit, to the first device, the SL CSI-RS based on the field representing transmission of the SL CSI-RS. In step S1630, the second device may receive, from the first device, SL channel state information obtained based on the SL CSI-RS. Herein, a report of the SL channel state information may be triggered based on the field representing transmission of the SL CSI-RS. For example, the field representing transmission of the SL CSI-RS may be a CSI request field.

The proposed method can be applied to device(s) described below. First, the processor (202) of the second device (200) may control the transceiver (206) to transmit, to a first device, sidelink control information (SCI) including a field representing transmission of a sidelink (SL) channel state information reference signal (CSI-RS). In addition, the processor (202) of the second device (200) may control the transceiver (206) to transmit, to the first device, the SL CSI-RS based on the field representing transmission of the SL CSI-RS. In addition, the processor (202) of the second device (200) may control the transceiver (206) to receive, from the first device, SL channel state information obtained based on the SL CSI-RS. Herein, a report of the SL channel state information may be triggered based on the field representing transmission of the SL CSI-RS. For example, the field representing transmission of the SL CSI-RS may be a CSI request field.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
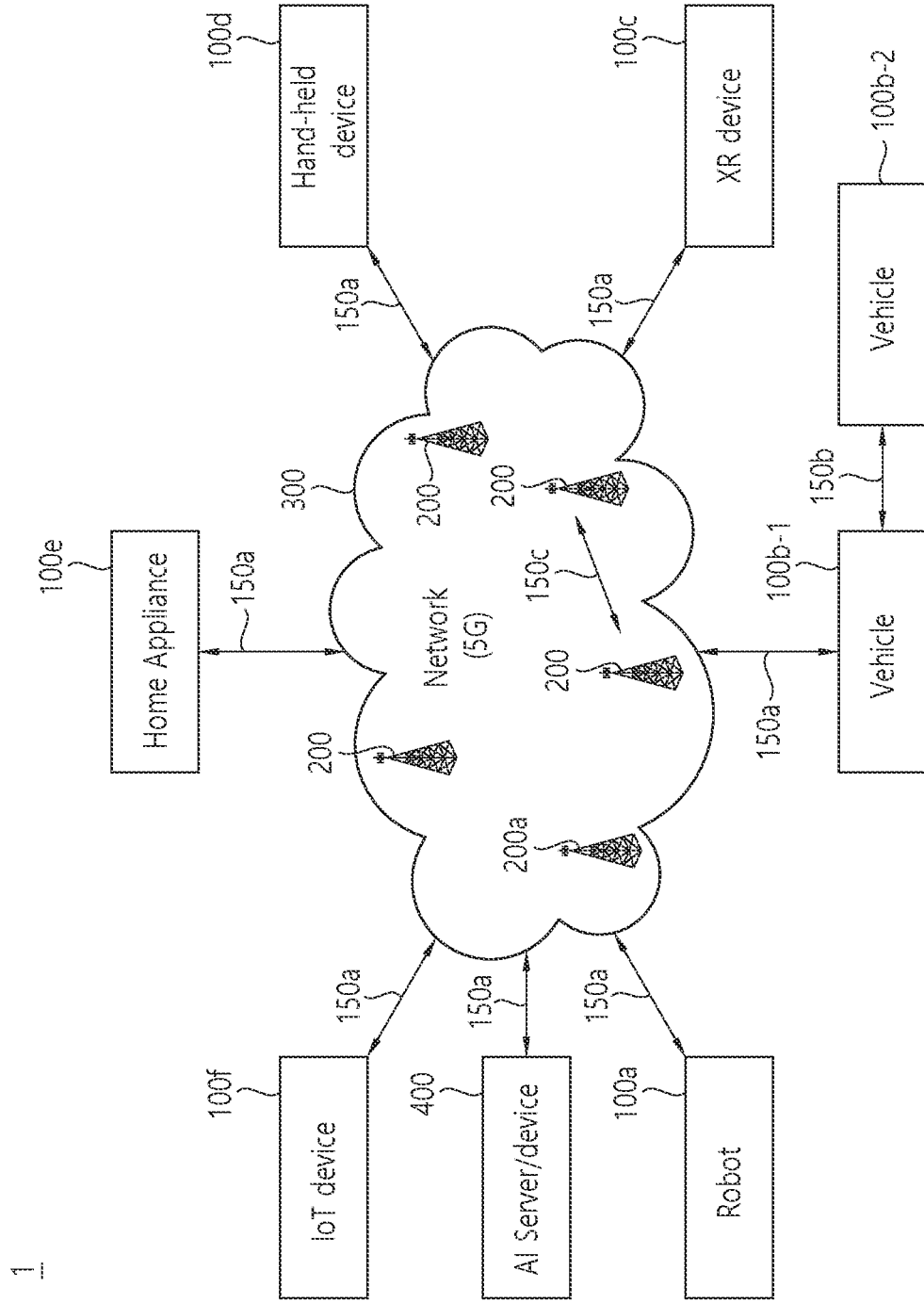
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
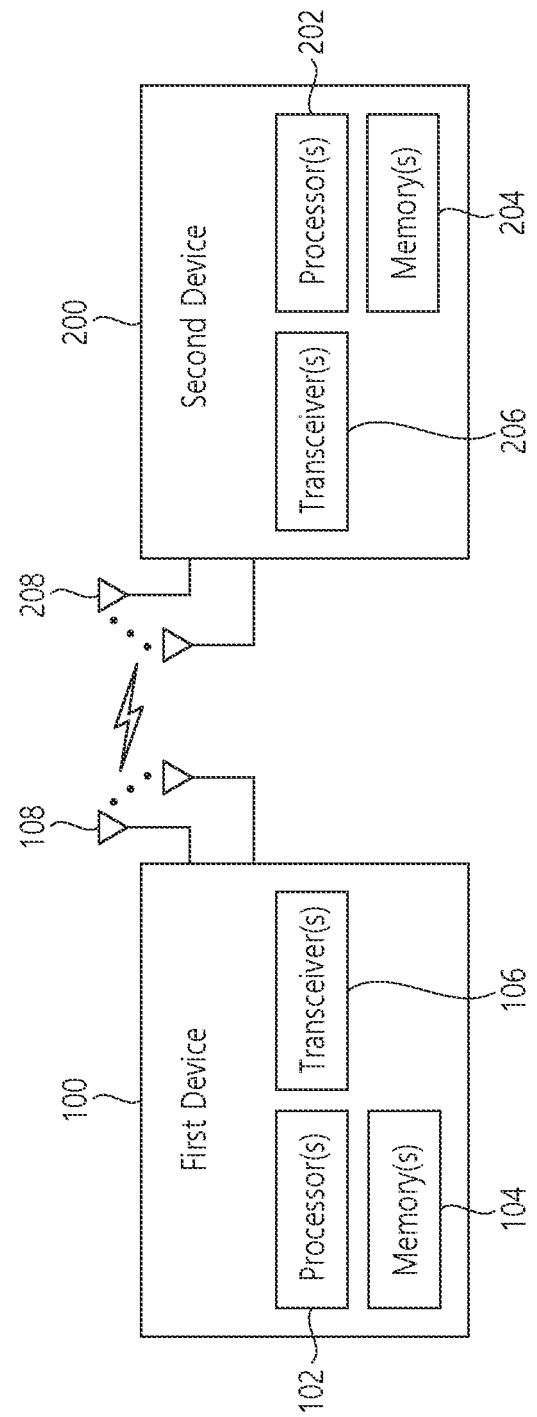
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
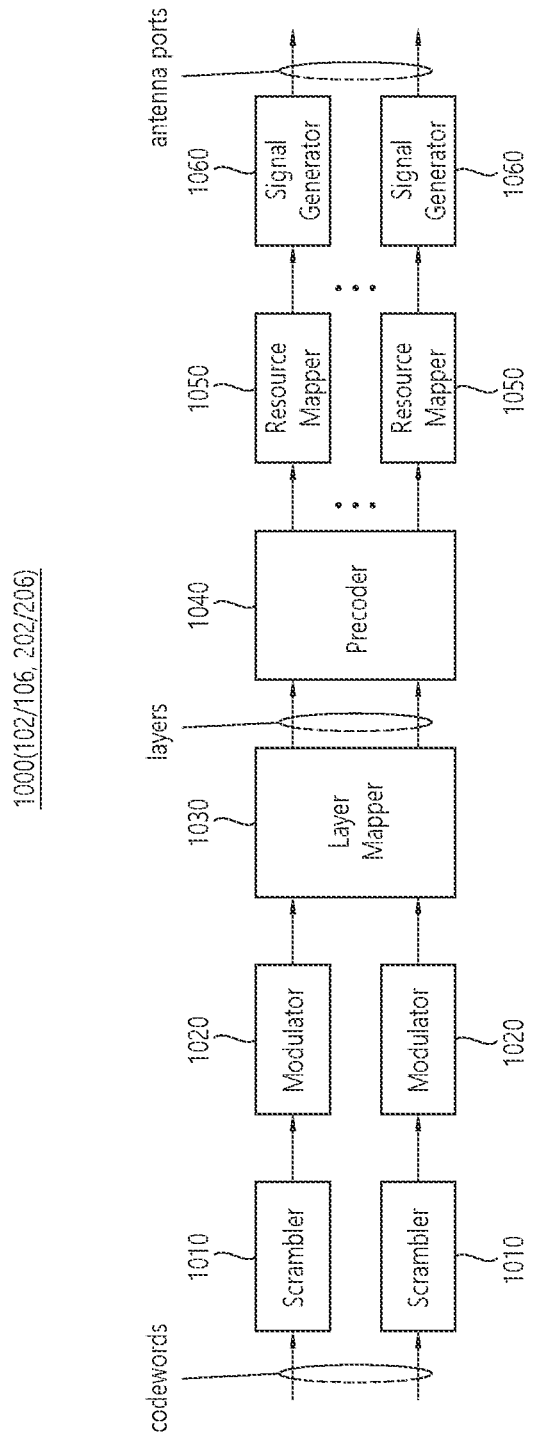
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
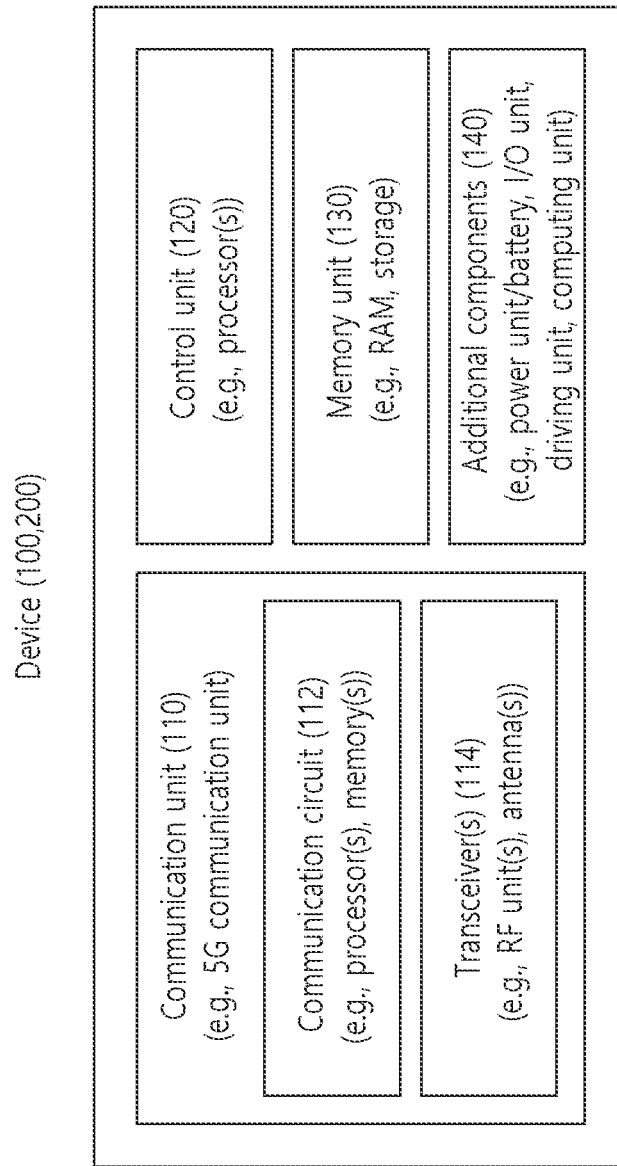
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
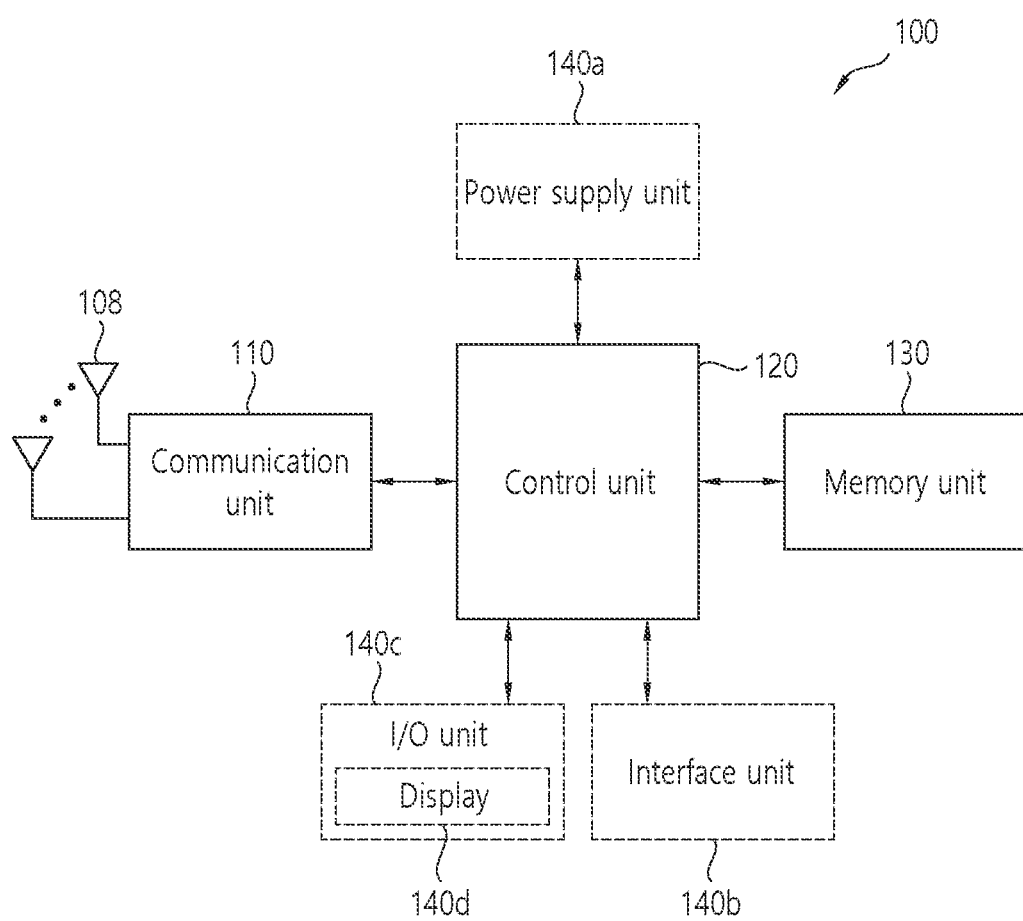
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
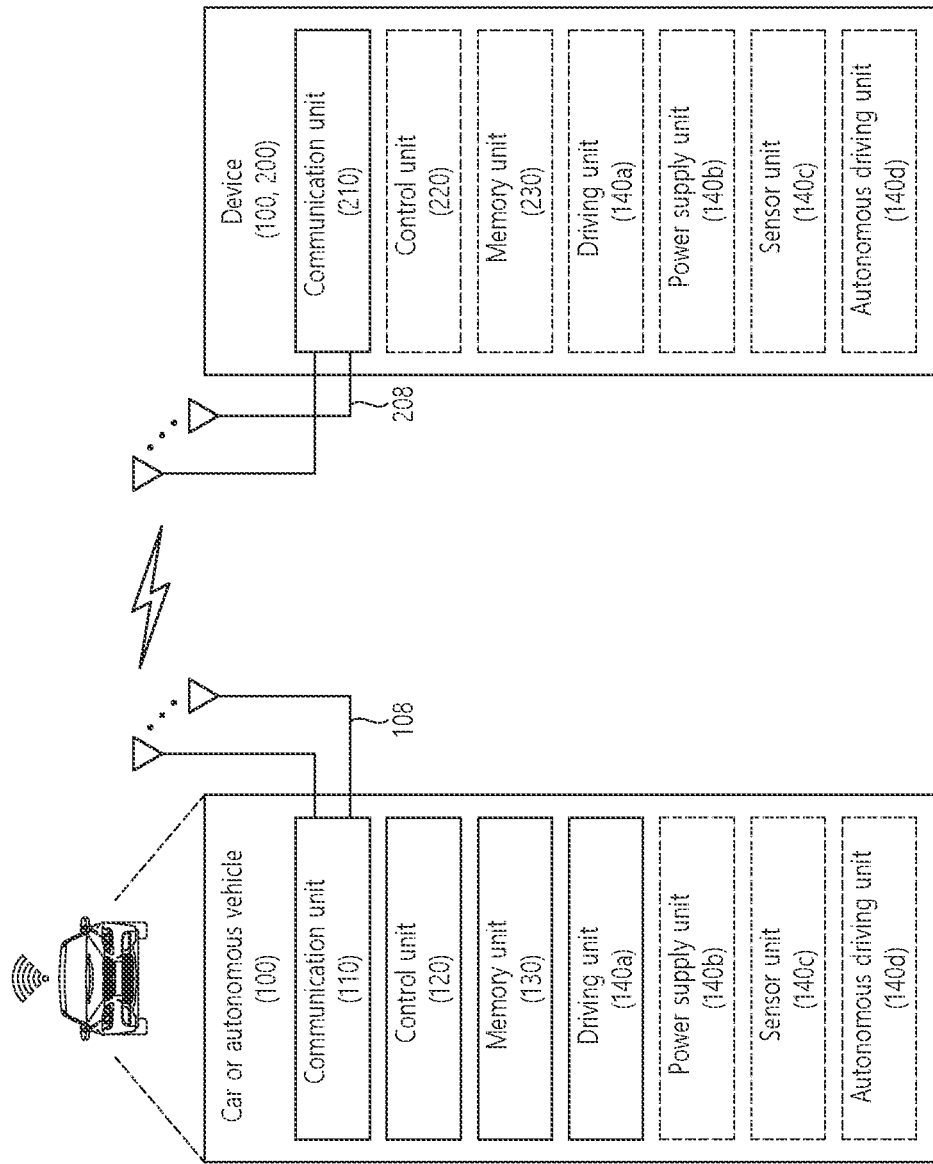
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, from a second device, first sidelink control information (SCI) including one field related to a sidelink (SL) channel state information (CSI) request;
   receiving, from the second device, a SL CSI-reference signal (RS);
   obtaining a SL CSI report based on the SL CSI-RS;
   transmitting, to the second device through a physical sidelink control channel (PSCCH), second SCI for scheduling a physical sidelink shared channel (PSSCH), wherein the second SCI includes priority information; and
   transmitting, to the second device through the PSSCH, the SL CSI report, wherein transmission of the SL CSI-RS and triggering of the SL CSI report are based on the one field related to the SL CSI request included in the first SCI, and wherein the priority information included in the second SCI is set to a value related to a highest priority pre-configured for the first device.

2. The method of claim 1, wherein the SL CSI report includes at least one of a channel quality indicator (CQI), a precoding matrix indicator (PMI), or a rank indicator (RI).

3. The method of claim 1, wherein, based on that the SL CSI report is transmitted through the PSSCH, the priority information included in the second SCI for scheduling the PSSCH is set to the value related to the highest priority.

4. The method of claim 1, wherein a priority of the SL CSI report transmitted through the PSSCH is 1.

5. The method of claim 1, wherein a priority of the SL CSI report is higher than a priority of SL traffic data.

6. The method of claim 1, wherein SL measurement information is transmitted to the second device through the PSSCH.

7. The method of claim 6, wherein the SL measurement information includes at least one of reference signal received power (RSRP), reference signal received quality (RSRQ), or received signal strength indicator (RSSI) between the first device and the second device.

8. The method of claim 6, wherein a priority of the SL measurement information is higher than a priority of the SL CSI report.

9. The method of claim 8, wherein the priority of the SL CSI report is higher than a priority of SL traffic data.

10. The method of claim 6, wherein the SL measurement information is transmitted to the second device, based on that reference signal received power (RSRP) between the first device and the second device measured by the first device is being greater than a threshold value.

11. The method of claim 6, wherein the SL measurement information is transmitted to the second device, based on that reference signal received power (RSRP) between the first device and the second device measured by the first device is smaller than a threshold value.

12. The method of claim 6, wherein the SL measurement information is transmitted to the second device, based on that first reference signal received power (RSRP) between the first device and the second device measured or reported by the first device is changed by more than a pre-configured threshold value, compared to second RSRP measured or reported previously.

13. A first device adapted to configured to perform wireless communication, the first device comprising:
at least one transceiver;
at least one processor; and
at least one memory connected to the at least one processor and storing instructions that, based on being executed, cause the first device to perform operations comprising:
receiving, from a second device, first sidelink control information (SCI) including one field related to a sidelink (SL) channel state information (CSI) request;
receiving, from the second device, a SL CSI-reference signal (RS);
obtaining a SL CSI report based on the SL CSI-RS;
transmitting, to the second device through a physical sidelink control channel (PSCCH), second SCI for scheduling a physical sidelink shared channel (PSSCH), wherein the second SCI includes priority information; and
transmitting, to the second device through the PSSCH, the SL CSI report,
wherein transmission of the SL CSI-RS and triggering of the SL CSI report are based on the one field related to the SL CSI request included in the first SCI, and
wherein the priority information included in the second SCI is set to a value related to a highest priority pre-configured for the first device.

14. The first device of claim 13, wherein the SL CSI report includes at least one of a channel quality indicator (CQI), a precoding matrix indicator (PMI), or a rank indicator (RI).

15. The first device of claim 13, wherein, based on that the SL CSI report is transmitted through the PSSCH, the priority information included in the second SCI for scheduling the PSSCH is set to the value related to the highest priority.

16. The first device of claim 13, wherein a priority of the SL CSI report transmitted through the PSSCH is 1.

17. A processing device adapted to control a first device, the processing device comprising:
at least one processor; and
at least one memory connected to the at least one processor and storing instructions that, based on being executed, cause the first device to perform operations comprising:
receiving, from a second device, first sidelink control information (SCI) including one field related to a sidelink (SL) channel state information (CSI) request;
receiving, from the second device, a SL CSI-reference signal (RS);
obtaining a SL CSI report based on the SL CSI-RS;
transmitting, to the second device through a physical sidelink control channel (PSCCH), second SCI for scheduling a physical sidelink shared channel (PSSCH), wherein the second SCI includes priority information; and
transmitting, to the second device through the PSSCH, the SL CSI report,
wherein transmission of the SL CSI-RS and triggering of the SL CSI report are based on the one field related to the SL CSI request included in the first SCI, and
wherein the priority information included in the second SCI is set to a value related to a highest priority pre-configured for the first device.

18. The first device of claim 13, wherein a priority of the SL CSI report is higher than a priority of SL traffic data.

19. The processing device of claim 17, wherein the SL CSI report includes at least one of a channel quality indicator (CQI), a precoding matrix indicator (PMI), or a rank indicator (RI).

20. The processing device of claim 17, wherein, based on that the SL CSI report is transmitted through the PSSCH, the priority information included in the second SCI for scheduling the PSSCH is set to the value related to the highest priority.

21. The processing device of claim 17, wherein a priority of the SL CSI report transmitted through the PSSCH is 1.

22. The processing device of claim 17, wherein a priority of the SL CSI report is higher than a priority of SL traffic data.

* * * * *